(12) United States Patent
Jiang et al.

(10) Patent No.: US 9,908,969 B2
(45) Date of Patent: Mar. 6, 2018

(54) CHLORINATED POLY(PROPYLENE CARBONATE) AND PREPARATION METHOD THEREOF

(71) Applicant: Changchun Institute of Applied Chemistry, Chinese Academy of Sciences, Jilin (CN)

(72) Inventors: Wei Jiang, Jilin (CN); Guiyan Zhao, Jilin (CN); Lisong Dong, Jilin (CN); Jing Jin, Jilin (CN); Jie Cui, Jilin (CN)

(73) Assignee: Changchun Institute of Applied Chemistry, Chinese Academy of Sciences, Jilin (CN)

( * ) Notice: Subject to any disclaimer, the term of this patent is extended or adjusted under 35 U.S.C. 154(b) by 0 days.

(21) Appl. No.: 15/275,288

(22) Filed: Sep. 23, 2016

(65) Prior Publication Data

US 2017/0009013 A1 Jan. 12, 2017

Related U.S. Application Data

(62) Division of application No. 14/686,727, filed on Apr. 14, 2015, now Pat. No. 9,546,245.

(30) Foreign Application Priority Data

Apr. 17, 2014 (CN) .......................... 2014 1 0155108

(51) Int. Cl.
 *C08G 64/42* (2006.01)
 *C08G 64/02* (2006.01)
 *C09D 11/00* (2014.01)
 *C09D 169/00* (2006.01)

(52) U.S. Cl.
 CPC ......... *C08G 64/42* (2013.01); *C08G 64/0233* (2013.01); *C09D 11/00* (2013.01); *C09D 169/00* (2013.01)

(58) Field of Classification Search
 CPC .......................... C08G 64/42; C08G 64/0233
 See application file for complete search history.

(56) References Cited

U.S. PATENT DOCUMENTS

| 3,313,719 A * | 4/1967 | Springmann ........ C07D 317/36 |
| | | 204/157.69 |
| 4,650,832 A | 3/1987 | Kowalski |
| 2010/0256329 A1 | 10/2010 | Nozaki |

FOREIGN PATENT DOCUMENTS

| CN | 1176269 A | 3/1998 |
| CN | 1436812 A | 8/2003 |

OTHER PUBLICATIONS

Wu, Perfectly Alternating Copolymerization of CO2 and Epichlorhydrin Using Cobalt (III)-Based Catalyst Systems; Journal of the American Chemical Society 133 (2011) pp. 15191-15199.*

* cited by examiner

*Primary Examiner* — David J Buttner
(74) *Attorney, Agent, or Firm* — Barry L. Davison; Davis Wright Tremaine LLP

(57) ABSTRACT

This invention provides a chlorinated poly(propylene carbonate) and the preparation method thereof, the chlorinated poly(propylene carbonate) is as represented by formula (I). Compared to the prior poly(propylene carbonate)s, the chlorinated poly(propylene carbonate) has relatively stronger electronegativity due to the presence of chlorine atoms and the interaction of the chlorinated poly(propylene carbonate) with other polar materials can be enhanced, so that it can be widely used as a compatibilizer, a binder, a paint, an ink, and the like. After the introduction of chlorine atoms, hydrogen bond interaction is generated within the chlorinated poly(propylene carbonate), so that its processability and mechanical properties are both improved. Furthermore, the chlorine atom may improve the flame retardancy of chlorinated poly(propylene carbonate) materials.

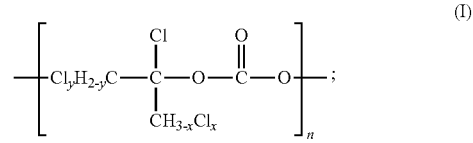

15 Claims, 2 Drawing Sheets

CHLORINATED POLY(PROPYLENE CARBONATE) AND PREPARATION METHOD THEREOF

CROSS-REFERENCE TO RELATED APPLICATIONS

This application is a divisional of U.S. patent application Ser. No. 14/686,727, filed Apr. 14, 2015 now U.S. Pat. No. 9,546,245 and entitled "CHLORINATED POLY(PROPYLENE CARBONATE) AND PREPARATION METHOD THEREOF," incorporated by reference herein in its entirety.

FIELD OF THE INVENTION

The present invention belongs to the technical field of polymer materials, and particularly relates to a chlorinated poly(propylene carbonate) and the preparation method thereof.

BACKGROUND OF THE INVENTION

Carbon dioxide is an inexhaustible inexpensive chemical raw material, and it has been recently noted to fix carbon dioxide into a chemical material on a large scale. Since Inoue et. al. synthesized aliphatic polycarbonates having high molecular weight by using the copolymerization of carbon dioxide and an epoxy compound in 1969, the study on the copolymerization of carbon dioxide and epoxy compounds has been continuously deepened and developed. Furthermore, it is a research focus in the field of polymer sciences to synthesize polymer materials by using carbon dioxide as the raw material. Poly(propylene carbonate) (PPC) is an alternating copolymer of carbon dioxide and propylene oxide, which belongs to the biodegradable environment-friendly materials.

At present, poly(propylene carbonate) (PPC), the copolymerization product of carbon dioxide and propylene oxide, have been put into the stage of industrial production. However, since it has a glass transition temperature (Tg) of commonly 30° C.-40° C. and is amorphous, there are defects such as large brittleness at low temperature, poor dimensional stability at high temperature, and the like. It is difficult to be used as plastic alone, and is generally used as a modifier for rubber or plastic, which limits its wide development and application.

Chinese Patent Publication No. CN1176269 discloses a modification method of an aliphatic polycarbonate styrene-butadiene rubber. This modification method may not only provide a modified styrene-butadiene rubber having excellent thermal resistance and mechanical properties, but also this method employs inexpensive aliphatic polycarbonate modified styrene-butadiene rubber, and the aliphatic polycarbonate is synthesized by the copolymerization of carbon dioxide. The cost of the modified product is similar to that of a pure styrene-butadiene rubber. The wide use of aliphatic carbonate may not only develop new resources and alleviate shortage of chemical raw materials, but also has great significance for controlling the content of carbon dioxide in atmosphere, alleviating global green-house effect, and protecting ecological environment.

Chinese Patent Publication No. CN1436812A discloses a composite of a polyhydroxyalkanoate and a poly(propylene carbonate). This composite is obtained by premixing 100 parts by weight of one or more polyhydroxyalkanoates, 10-100 parts by weight of a poly(propylene carbonate), 10-100 parts by weight of a plasticizer, 1-3 parts by weight of an antioxidant, and 1-4 parts by weight of a nucleating agent and then mixing and pelletizing the mixture at the melting temperature of polyhydroxyalkanoates. This composite combines the advantages of a polyhydroxyalkanoate and a poly(propylene carbonate), improves the brittleness of the polyhydroxyalkanoate, and has good overall mechanical properties.

SUMMARY OF THE INVENTION

In view of this, the technical problem to be solved by this invention is to provide a chlorinated poly(propylene carbonate) and the preparation method thereof, and this chlorinated poly(propylene carbonate) has wide applications.

This invention provides a chlorinated poly(propylene carbonate) represented by formula (I):

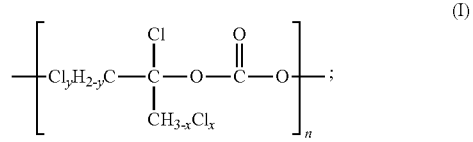

wherein x is an integer of 0-3; y is an integer of 0-2; and n is degree of polymerization.

Preferably, said n is 50-5000.

This invention further provides a preparation method of a chlorinated poly(propylene carbonate), comprising:
mixing a poly(propylene carbonate) with a first dispersant, and introducing chlorine for performing reaction to obtain a chlorinated poly(propylene carbonate) represented by formula (I):

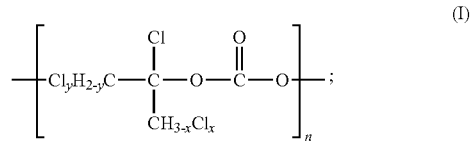

wherein x is an integer of 0-3; y is an integer of 0-2; and n is degree of polymerization.

Preferably, the mass ratio of the poly(propylene carbonate) to the dispersant is 100:(0.1-10).

This invention further provides a preparation method of a chlorinated poly(propylene carbonate), comprising:
mixing a poly(propylene carbonate) with an organic solvent, and introducing chlorine for performing reaction to obtain a chlorinated poly(propylene carbonate) represented by formula (I):

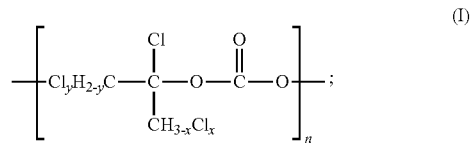

wherein x is an integer of 0-3; y is an integer of 0-2; and n is degree of polymerization.

Preferably, the preparation method further makes use of a first initiator, wherein the first initiator is one or more selected from a peroxide, an azo compound, tert-butyl perbenzoate, potassium persulfate, sodium sulfite, N,N-dimethylaniline, N,N-dimethyl-p-toluidine, and N,N-di(2-hydroxyethyl) p-toluidine.

This invention further provides a preparation method of a chlorinated poly(propylene carbonate), comprising:

mixing a poly(propylene carbonate), an emulsion accelerator, and a second dispersant with water, and introducing chlorine for performing reaction to obtain a chlorinated poly(propylene carbonate) represented by formula (I):

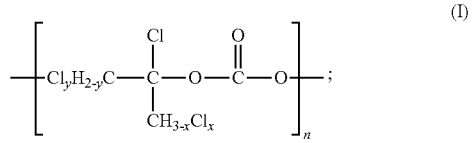

wherein x is an integer of 0-3; y is an integer of 0-2; and n is degree of polymerization.

Preferably, the preparation method further makes use of a second initiator, wherein the second initiator is one or more selected from a hydrogen peroxide-sodium nitrite system, a hydrogen peroxide-ferrous nitrate system, a hydrogen peroxide-silver nitrate system, a hydrogen peroxide-sodium bisulfate system, a hydrogen peroxide-ferrous ammonium sulfate system, a persulfate-sulfite system, a persulfate-mercaptan system, a dibenzoyl peroxide-ferrous sulfate system, a dibenzoyl peroxide-formic acid system, a dibenzoyl peroxide-mercaptan system, a dibenzoyl peroxide-thiophenol system, a lauroyl peroxide-ferrous sulfate system, a lauroyl peroxide-formic acid system, a lauroyl peroxide-mercaptan system, a lauroyl peroxide-thiophenol system, a cumene hydroperoxide-ferrous salt system, a cumene hydroperoxide-dihydroxyacetone system, a cumene hydroperoxide derivative-ferrous salt system, a cumene hydroperoxide derivative-dihydroxyacetone system, a furan hydroperoxide-ferrous salt system, a furan hydroperoxide-dihydroxyacetone system, a tert-butyl hydroperoxide-ferrous salt system, and a tert-butyl hydroperoxide-dihydroxyacetone system.

Preferably, the emulsion accelerator is one or more selected from a polyoxyethylene fatty alcohol, a polyoxyethylene alkylphenol, and a polyoxyethylene fatty alcohol ether.

Preferably, the mass ratio between the poly(propylene carbonate), the emulsion accelerator, and the second dispersant is 100:(0.1-10):(0.1-10).

This invention provides a chlorinated poly(propylene carbonate) and the preparation method thereof, and the chlorinated poly(propylene carbonate) is as represented by formula (I). Compared to the prior poly(propylene carbonate)s, the chlorinated poly(propylene carbonate) has relatively stronger electronegativity due to the presence of chlorine atoms and the interaction of the chlorinated poly(propylene carbonate) with other polar materials can be enhanced, so that it can be widely used as a compatilizer, a binder, a paint, an ink, and the like. After the introduction of chlorine atoms, hydrogen bond interaction is generated within the chlorinated poly(propylene carbonate), so that its processability and mechanical properties are both improved. Furthermore, the chlorine atom may improve the flame retardancy of chlorinated poly(propylene carbonate) materials.

DETAILED DESCRIPTION OF THE INVENTION

This invention provides a chlorinated poly(propylene carbonate) represented by formula (I):

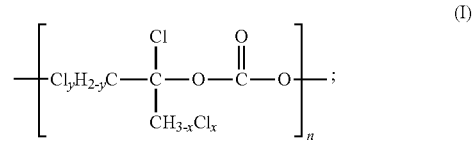

wherein x is an integer of 0-3, preferably an integer of 1-2; y is an integer of 0-2, preferably an integer of 1-2; and n is degree of polymerization, preferably 50-5000.

This invention further provides a solid phase preparation method of the chlorinated poly(propylene carbonate) represented by the above formula (I), comprising: mixing a poly(propylene carbonate) with a first dispersant, and introducing chlorine for performing reaction to obtain a chlorinated poly(propylene carbonate) represented by formula (I).

Wherein, the sources of all raw materials in this invention are not particularly limited, and those commercially available may be used.

The first dispersant is not particularly limited, as long as it is one that is well known by the person skilled in the art, and it is preferably white carbon black in the present invention. The poly(propylene carbonate) and the first dispersant are mixed in a mass ratio of preferably 100:(0.1-10) and more preferably 100:(0.5-6).

Figure 1:
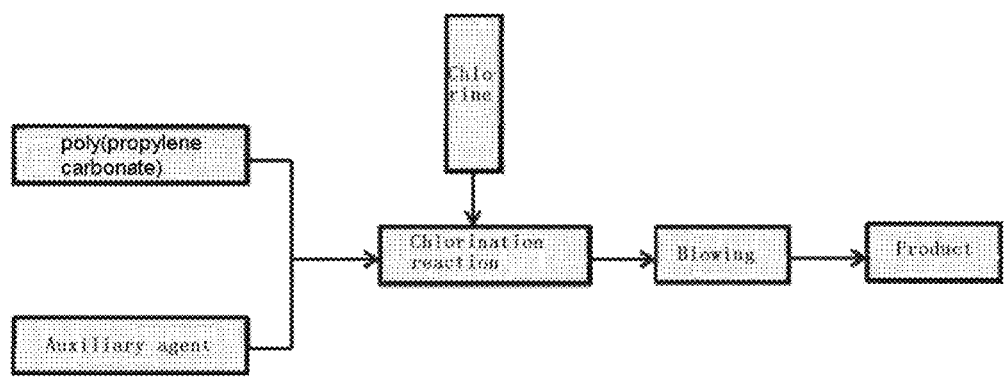
FIG. 1 is a process flow chart of a solid phase method for preparing the chlorinated poly(propylene carbonate) represented by formula (I) of this invention.

After the poly(propylene carbonate) is mixed with the first dispersant, chlorine is introduced for performing reaction to obtain a chlorinated poly(propylene carbonate) represented by formula (I). The process flow chart of this solid phase method is as shown in FIG. 1, and the auxiliaries include a first dispersant and a first initiator. The molar ratio of the chlorine to the poly(propylene carbonate) is preferably (1-6):1; the temperature of the reaction is preferably −10° C.-100° C., more preferably 0° C.-80° C., and still more preferably 10° C.-60° C.; the time of the reaction is preferably 10-300 min, and more preferably 50-200 min.

When the temperature of the reaction is lower than the glass transition temperature of the poly(propylene carbonate) (30° C.-40° C.), a first initiator is preferably added, and the first initiator is preferably one or more of a peroxide, an azo compound, tert-butyl perbenzoate, potassium persulfate, sodium sulfite, N,N-dimethylaniline, N,N-dimethyl-p-toluidine, and N,N-di(2-hydroxyethyl) p-toluidine, and more preferably a mixture of an oxidative initiator and a reductive initiator, wherein the molar ratio of the oxidative initiator to the reductive initiator is preferably greater than 1. The oxidative initiator is preferably a peroxide and/or tert-butyl perbenzoate, and more preferably one or more of dibenzoyl peroxide, methyl ethyl ketone peroxide, cyclohexanone peroxide, tert-butyl hydroperoxide, and tert-butyl perbenzoate. The reductive initiator is preferably one or more of N,N-dimethylaniline, N,N-dimethyl-p-toluidine, and N,N-di(2-hydroxyethyl) p-toluidine. The mass of the first initiator is preferably 0.01%-5%, more preferably 0.1%-5% of the mass of the poly(propylene carbonate).

When the temperature of the reaction is higher than the glass transition temperature of the poly(propylene carbonate), the first initiator may not be added, and the reaction may occur under the condition of heat initiation or ultraviolet initiation. The first initiator may also be added to accelerate the progress of the reaction, and at this point, the first initiator is preferably one or more of dibenzoyl peroxide, azobisisobutyronitrile, and potassium persulfate. The mass of the first initiator is preferably 0.01%-5%, more preferably 0.1%-3% of the mass of the poly(propylene carbonate).

This invention further provides another method for preparing the chlorinated poly(propylene carbonate) represented by the above formula (I) through a solution method, comprising: mixing a poly(propylene carbonate) with an organic solvent, and introducing chlorine for performing reaction to obtain a chlorinated poly(propylene carbonate) represented by formula (I).

wherein the organic solvent is not particularly limited, as long as it is one capable of dissolving poly(propylene carbonate)s that is well known by the person skilled in the art, and it is preferably carbon tetrachloride in the present invention; the ratio of the mass of the poly(propylene carbonate) to the volume of the organic solvent is preferably 1 g:(5-20) ml, more preferably 1 g:(8-15) ml.

After the poly(propylene carbonate) is mixed with the organic solvent, chlorine is introduced for performing reaction, wherein the molar ratio of the chlorine to the poly(propylene carbonate) is preferably (1-6):1; the temperature of the reaction is preferably −10° C.-100° C., more preferably 0° C.-80° C., and still more preferably 10° C.-60° C.; the time of the reaction is preferably 10-300 min, and more preferably 50-200 min.

When the temperature of the reaction is lower than the glass transition temperature of the poly(propylene carbonate) (30° C.-40° C.), a first initiator is preferably added, and the first initiator is preferably one or more of a peroxide, an azo compound, tert-butyl perbenzoate, potassium persulfate, sodium sulfite, N,N-dimethylaniline, N,N-dimethyl-p-toluidine, and N,N-di(2-hydroxyethyl) p-toluidine, and more preferably a mixture of an oxidative initiator and a reductive initiator, wherein the molar ratio of the oxidative initiator to the reductive initiator is preferably greater than 1. The oxidative initiator is preferably a peroxide and/or tert-butyl perbenzoate, and more preferably one or more of dibenzoyl peroxide, methyl ethyl ketone peroxide, cyclohexanone peroxide, tert-butyl hydroperoxide, and tert-butyl perbenzoate. The reductive initiator is preferably one or more of N,N-dimethylaniline, N,N-dimethyl-p-toluidine, and N,N-di(2-hydroxyethyl) p-toluidine. The mass of the first initiator is preferably 0.01%-5%, more preferably 0.1%-5% of the mass of the poly(propylene carbonate).

When the temperature of the reaction is higher than the glass transition temperature of the poly(propylene carbonate), the first initiator may not be added, and the reaction may occur under the condition of heat initiation or ultraviolet initiation. The first initiator may also be added to accelerate the progress of the reaction, and at this point, the first initiator is preferably one or more of dibenzoyl peroxide, azobisisobutyronitrile, and potassium persulfate. The mass of the first initiator is preferably 0.01%-5%, more preferably 0.1%-3% of the mass of the poly(propylene carbonate).

Figure 2:
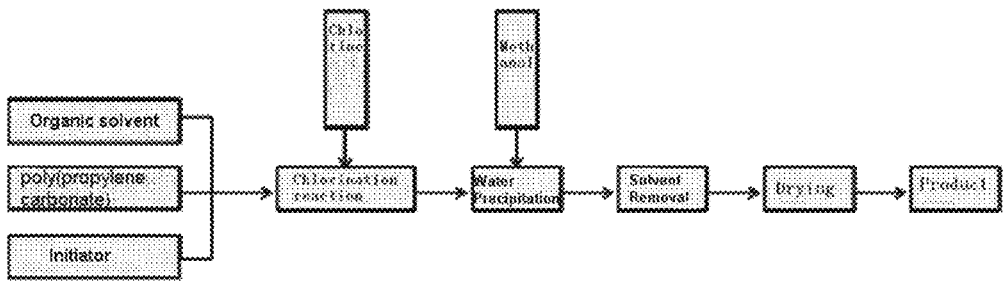
FIG. 2 is a process flow chart of a solution method for preparing the chlorinated poly(propylene carbonate) represented by formula (I) of this invention.

After the reaction, the organic solvent is preferably removed, and upon drying, the chlorinated poly(propylene carbonate) represented by formula (I) is obtained. The process flow chart of this solution method is as shown in FIG. 2.

This invention further provides a method for preparing the chlorinated poly(propylene carbonate) represented by the above formula (I) through a water phase suspension method, comprising: mixing a poly(propylene carbonate), an emulsion accelerator, a second dispersant with water, and introducing chlorine for performing reaction to obtain a chlorinated poly(propylene carbonate) represented by formula (I).

Wherein the emulsion accelerator is not particularly limited, as long as it is one that is well known by the person skilled in the art, and it is preferably one or more of a polyoxyethylene fatty alcohol, a polyoxyethylene alkylphenol, and a polyoxyethylene fatty alcohol ether in the present invention; the second dispersant is not particularly limited, as long as it is one that is well known by the person skilled in the art, and it is preferably one or more of sodium polymethacrylate, polyvinyl pyrrolidone, and an ethylene oxide-propylene oxide copolymer in the present invention; the mass ratio between the poly(propylene carbonate), the emulsion accelerator, and the second dispersant is preferably 100:(0.1-10):(0.1-10); and the ratio of the mass of the poly(propylene carbonate) to the volume of water is preferably 1:(10-30), more preferably 1:(15-25).

After the poly(propylene carbonate), the emulsion accelerator, the second dispersant, and the water are mixed, a second initiator is preferably further added. The second initiator is preferably one or more of a hydrogen peroxide-sodium nitrite system, a hydrogen peroxide-ferrous nitrate system, a hydrogen peroxide-silver nitrate system, a hydrogen peroxide-sodium bisulfite system, a hydrogen peroxide-ferrous ammonium sulfate system, a persulfate-sulfite system, a persulfate-mercaptan system, a dibenzoyl peroxide-ferrous sulfate system, a dibenzoyl peroxide-formic acid system, a dibenzoyl peroxide-mercaptan system, a dibenzoyl peroxide-thiophenol system, a lauroyl peroxide-ferrous sulfate system, a lauroyl peroxide-formic acid system, a lauroyl peroxide-mercaptan system, a lauroyl peroxide-thiophenol system, a cumene hydroperoxide-ferrous salt system, a cumene hydroperoxide-dihydroxyacetone system, a cumene hydroperoxide derivative-ferrous salt system, a cumene hydroperoxide derivative-dihydroxyacetone system, a furan hydroperoxide-ferrous salt system, a furan hydroperoxide-dihydroxyacetone system, a tert-butyl hydroperoxide-ferrous salt system, and a tert-butyl hydroperoxide-dihydroxyacetone system; and the mass ratio of the second initiator to the poly(propylene carbonate) is preferably (0.01-2):100, more preferably (0.1-2):100.

When the second initiator is not added, the reaction can be performed under the condition of heat initiation or ultraviolet initiation.

Chlorine is introduced for performing reaction, wherein the molar ratio of the chlorine to the poly(propylene carbonate) is preferably (1-6):1; the temperature of the reaction is preferably 4° C.-80° C., more preferably 10° C.-60° C., and still preferably 30° C.-60° C.; and the time of the reaction is preferably 10-300 min, and more preferably 50-200 min.

Figure 3:
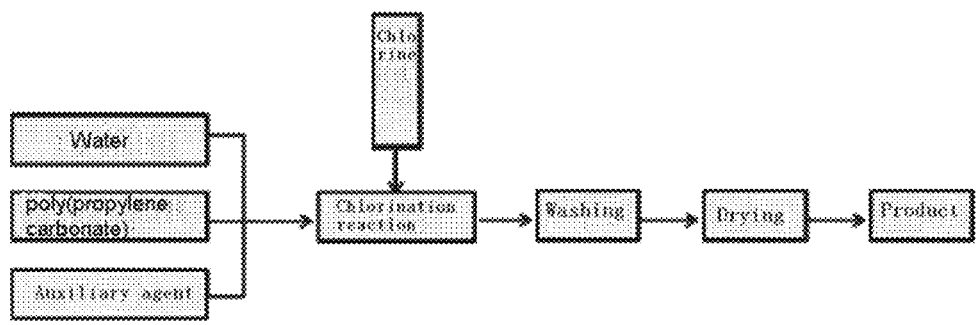
FIG. 3 is a process flow chart of a water phase suspension method for preparing the chlorinated poly(propylene carbonate) represented by formula (I) of this invention.

After reaction, an alcohol is preferably added to precipitate a product, and after washing and drying, the chlorinated poly(propylene carbonate) represented by formula (I) is obtained. More preferably, methanol is added to precipitate a product. At this time, the process flow chart of this water phase suspension method is as shown in FIG. 3.

In order to further illustrate this invention, the detailed description will be made in conjunction with the Examples below, with respect to a chlorinated poly(propylene carbonate) and the preparation method thereof.

All reagents used in the Examples below are commercially available.

Example 1

100 g of 60-mesh poly(propylene carbonate) (PPC) powder, 0.5 g of a mixture of benzoyl peroxide and dimethylaniline (the molar ratio of benzoyl peroxide to dimethylaniline was 1.5:1), and 5 g of white carbon black were added to a reactor, stirred and gradually cooled under the condition of water bath. When the temperature was lower than 15° C., it began to introduce chlorine. Before the temperature reached 10° C., the introduction amount of the chlorine reached 60% of the total amount of the chlorine introduced. Then, cooling was continued to 10° C., and the introduction amount of the chlorine reached 95% of the total amount introduced. Finally, 5% of the chlorine was introduced when the temperature was decreased to 5° C. The total amount of the chlorine introduced was 240 g. The reaction was performed for 2 h, followed by driving off the residual chlorine using clean air, and a white powdery chlorinated poly(propylene carbonate) containing chlorine in an amount of 9% was obtained.

Figure 4:
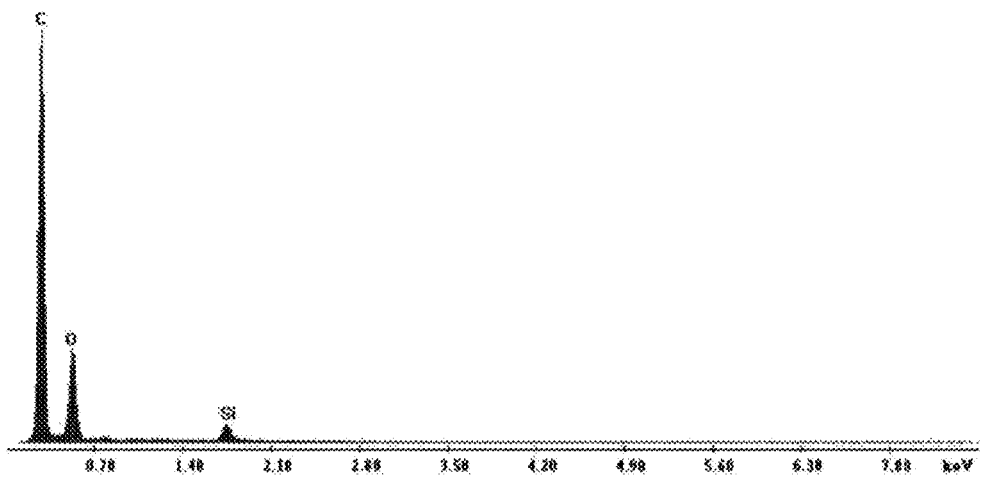
FIG. 4 is a spectrogram of the scanning electron microscope-energy dispersive spectrometry analysis of the poly(propylene carbonate) used in Example 1 of this invention.

The poly(propylene carbonate) used in Example 1 was coated on a silicon wafer and was analyzed using a scanning electron microscope to obtain a spectrogram of scanning electron microscopy-energy dispersive spectrometry analysis, as shown in FIG. 4.

Figure 5:
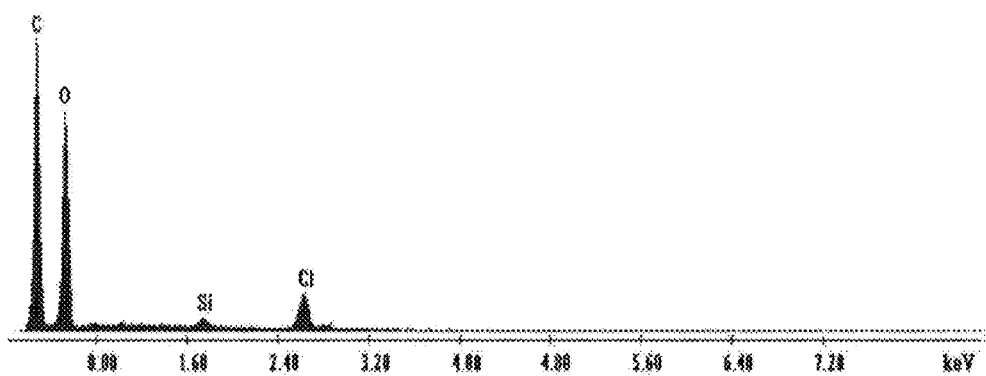
FIG. 5 is a spectrogram of the scanning electron microscope-energy dispersive spectrometry analysis of the chlorinated poly(propylene carbonate) prepared in Example 1 of this invention.

The chlorinated poly(propylene carbonate) obtained in Example 1 was coated on a silicon wafer and was analyzed using a scanning electron microscope to obtain a spectrogram of scanning electron microscope-energy dispersive spectrometry analysis, as shown in FIG. 5.

After the poly(propylene carbonate) used in Example 1 was coated on a silicon wafer, a water contact angle test was performed to obtain that the contact angle thereof was 90°.

After the chlorinated poly(propylene carbonate) obtained in Example 1 was coated on a silicon wafer, a water contact angle test was performed to obtain that the contact angle thereof was 65°. The above tests illustrated that the polarity of the chlorinated poly(propylene carbonate) was larger than that of the poly(propylene carbonate).

Example 2

100 g of 60-mesh poly(propylene carbonate) (PPC) powder was added to a reactor and was gradually cooled under the condition of ice water bath, followed by adding 0.3 g of a mixture of benzoyl peroxide and dimethylaniline (the molar ratio of benzoyl peroxide to dimethylaniline was 1.5:1) and 5 g of white carbon black. Chlorine was introduced, and was gradually cooled to room temperature. The total amount of the chlorine introduced was 240 g. The reaction was performed for 2 h, followed by driving off the residual chlorine using clean air, and a white powdery chlorinated poly(propylene carbonate) containing chlorine in an amount of 12% was obtained.

Example 3

100 g of 60-mesh poly(propylene carbonate) (PPC) powder, 0.4 g of benzoyl peroxide, and 5 g of white carbon black were added to a reactor. Chlorine was introduced, and the temperature risen to 55° C. The total amount of the chlorine introduced was 240 g. The reaction was performed for 2 h, followed by driving off the residual chlorine using clean air, and a white powdery chlorinated poly(propylene carbonate) containing chlorine in an amount of 24% was obtained.

Example 4

100 g of 60-mesh poly(propylene carbonate) (PPC) powder and 5 g of white carbon black were added to a reactor. Chlorine was introduced under the irradiation of ultraviolet, and the temperature risen to 30° C. The total amount of the chlorine introduced was 240 g. The reaction was performed for 2 h, followed by driving off the residual chlorine using clean air, and a white powdery chlorinated poly(propylene carbonate) containing chlorine in an amount of 9% was obtained.

Example 5

15 g of 120-mesh poly(propylene carbonate) (PPC) powder, 170 g of a tap water and 0.75 g of white carbon black were added to a reactor. Chlorine was introduced at 60° C. The total amount of the chlorine introduced was 140 g. The reaction time of the chlorination reaction was about 5 h. Then, the product was subjected to washing by a tap water, neutralizing by an alkali solution and drying to obtain a white powdery chlorinated poly(propylene carbonate) CPPC containing chlorine in an amount of 30%.

Those described above are merely the preferred embodiments of the invention, and it is to be indicated that, with respect to the person skilled in the art, various improvements and modifications can also be made without departing from the principle of this invention. These improvements and modifications should be considered as the scope to be protected by this invention.

What is claimed is:

1. A chlorinated poly(propylene carbonate) represented by formula (I):

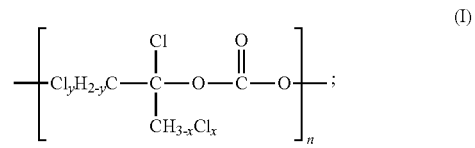

wherein x is an integer of 0-3; y is an integer of 0-2; and n is degree of polymerization.

2. The chlorinated poly(propylene carbonate) according to claim 1, wherein said n is 50-5000.

3. The chlorinated poly(propylene carbonate) according to claim 1, wherein x is an integer of 1-2.

4. The chlorinated poly(propylene carbonate) according to claim 1, wherein y is an integer of 1-2.

5. The chlorinated poly(propylene carbonate) according to claim 1, wherein x is an integer of 1-2, y is an integer of 1-2, and n is 50-5000.

6. A compatilizer or binder, comprising a chlorinated poly(propylene carbonate) represented by formula (I):

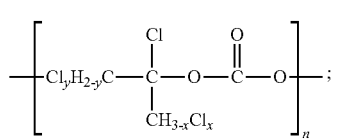

(I)

wherein x is an integer of 0-3; y is an integer of 0-2; and n is degree of polymerization.

7. The compatilizer or binder, comprising a chlorinated poly(propylene carbonate) according to claim 6, wherein said n is 50-5000.

8. The compatilizer or binder, comprising a chlorinated poly(propylene carbonate) according to claim 6, wherein x is an integer of 1-2.

9. The compatilizer or binder, comprising a chlorinated poly(propylene carbonate) according to claim 6, wherein y is an integer of 1-2.

10. The compatilizer or binder, comprising a chlorinated poly(propylene carbonate) according to claim 6, wherein x is an integer of 1-2, y is an integer of 1-2, and n is 50-5000.

11. A paint or ink, comprising a chlorinated poly(propylene carbonate) represented by formula (I):

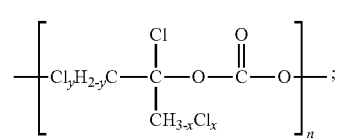

(I)

wherein x is an integer of 0-3; y is an integer of 0-2; and n is degree of polymerization.

12. The paint or ink, comprising a chlorinated poly(propylene carbonate) according to claim 11, wherein said n is 50-5000.

13. The paint or ink, comprising a chlorinated poly(propylene carbonate) according to claim 11, wherein x is an integer of 1-2.

14. The paint or ink, comprising a chlorinated poly(propylene carbonate) according to claim 11, wherein y is an integer of 1-2.

15. The paint or ink, comprising a chlorinated poly(propylene carbonate) according to claim 11, wherein x is an integer of 1-2, y is an integer of 1-2, and n is 50-5000.

* * * * *